United States Patent [19]
Moore

[11] 3,857,277
[45] Dec. 31, 1974

[54] FLOW INDICATOR
[75] Inventor: Edward H. Moore, Avon, Conn.
[73] Assignee: DeLaval Turbine, Inc., Princeton, N.J.
[22] Filed: Dec. 29, 1972
[21] Appl. No.: 319,662

[52] U.S. Cl. ................................. 73/28, 73/228
[51] Int. Cl. .......................................... G01f 1/06
[58] Field of Search............ 73/28, 228; 200/81.9 R; 340/239 R

[56] References Cited
UNITED STATES PATENTS

| 2,029,633 | 2/1936 | Muhleisen | 73/228 |
| 2,600,309 | 6/1952 | MacDonald et al. | 73/228 |
| 3,188,421 | 6/1965 | Rowell | 73/228 X |
| 3,199,488 | 8/1965 | Farr | 73/28 X |
| 3,224,270 | 12/1965 | Karol et al. | 73/228 X |
| 3,559,197 | 1/1971 | Jarvis et al. | 73/228 |

Primary Examiner—Richard C. Queisser
Assistant Examiner—Stephen A. Kreitman
Attorney, Agent, or Firm—McCormick, Paulding & Huber

[57] ABSTRACT

A flow indicator comprising a housing having a chamber therein and including inlet and outlet openings communicating with opposite ends of the chamber. A flexible flap hingedly connected to the housing for flexure within the chamber in response to fluid flow through the chamber is visible through a transparent observation port to provide direct indication of fluid flow. A magnet carried by the flap actuates at least one magnetically responsive switch mounted in the housing and adapted for connection in an external circuit to alter the condition of the circuit in response to at least one predetermined flow condition. The flap also functions as a check valve to prevent retrograde fluid flow through the housing.

9 Claims, 5 Drawing Figures 3,857,277

FLOW INDICATOR

BACKGROUND OF THE INVENTION

This invention relates in general to flow indicating devices and deals more particularly with an improved flow indicator of magnetically actuated type. The general aim of the present invention is to provide an improved flow responsive device for operating a remote indicator or alarm or for providing automatic system control in response to at least one fluid flow condition and for also providing direct visual indication of a range of fluid flow conditions, if desired. While the device of the present invention may be employed to indicate the flow condition of any fluid, it is particularly suitable for use where the fluid to be monitored may be contaminated with foreign particles or other foreign matter. The device of the present invention is designed for long-life service and dependability and to resist clogging even under extreme conditions of fluid contamination. The simplicity of construction facilitates low cost manufacture.

SUMMARY OF THE INVENTION

In accordance with the present invention, an improved fluid flow indicator is provided which includes a housing having a flexible flap supported within a chamber for flexure therein about generally parallel axes and disposed in the path of fluid flow therethrough. Means is provided to change the axis of flexure of said flap in response to change in fluid flow through the chamber. A permanent magnet carried by the flap actuates at least one magnetically responsive switch supported by the housing in response to a predetermined fluid flow condition. The housing may be provided with a transparent observation port through which the relative position of the flap may be viewed to provide direct visible indication of fluid flow through a range of flow conditions.

DETAILED DESCRIPTION OF THE PREFERRED EMBODIMENT

Figure 1:
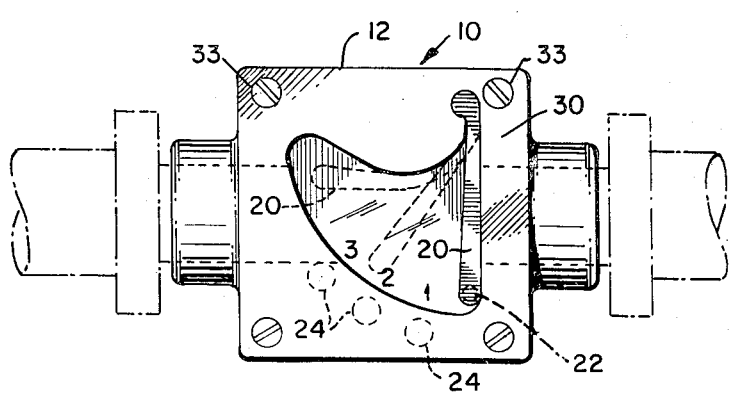
FIG. 1 is a side elevational view of a fluid flow indicator embodying the present invention.
Figure 2:
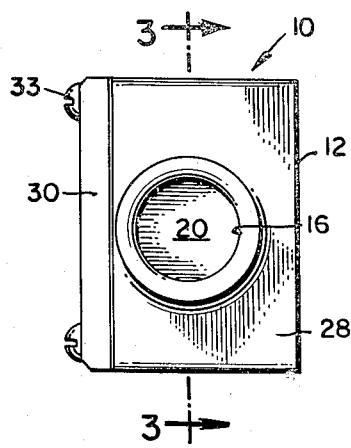
FIG. 2 is a right end elevational view of the fluid flow indicator of FIG. 1.
Figure 3:
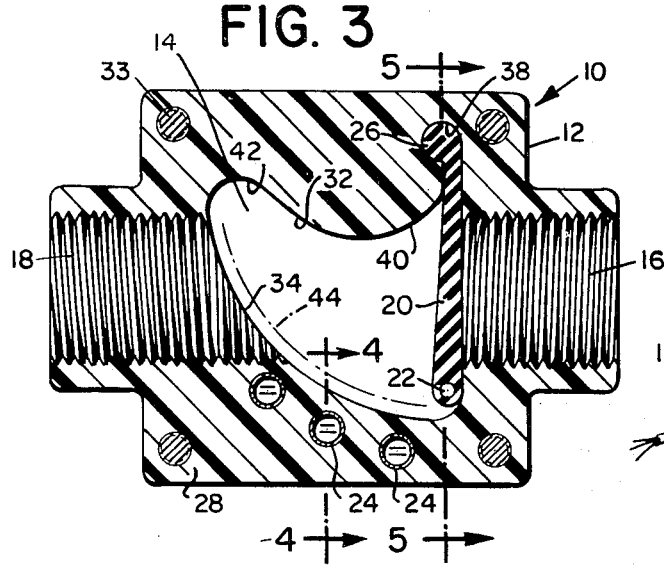
FIG. 3 is a somewhat enlarged sectional view taken along the line 3—3 of FIG. 2.
Figure 4:
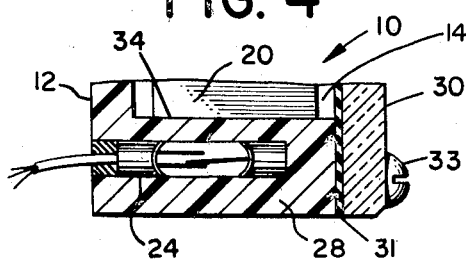
FIG. 4 is a fragmentary sectional view taken along the line 4—4 of FIG. 3.

Turning now to the drawings and referring first particularly to FIGS. 1–3 thereof, a fluid flow indicator embodying the present invention and indicated generally by the reference numeral 10 comprises a housing 12 which has a chamber 14 therein and includes an inlet opening 16 and an outlet opening 18 which respectively communicate with opposite ends of the chamber. A flexible flap 20 hingedly supported on the housing within the chamber 14 is disposed in the path of fluid flow from the inlet opening 16 to the outlet opening 18 for flexure about generally parallel axes and generally toward the outlet opening in response to fluid flow through the housing. A permanent magnet 22 carried by the flap 20 actuates at least one magnetically responsive switch 24 supported by the housing and adapted for connection in an external electrical circuit (not shown) to operate an indicator or alarm or to operate relays or the like to provide automatic system control. The switch 24 is within the magnetic influence of the magnet 22 during at least a portion of flexure movement of the flap 20 toward the outlet opening 18. The housing 12 may, if desired, be provided with a transparent observation port through which the relative position of the flap 20 may be viewed.

Figure 5:
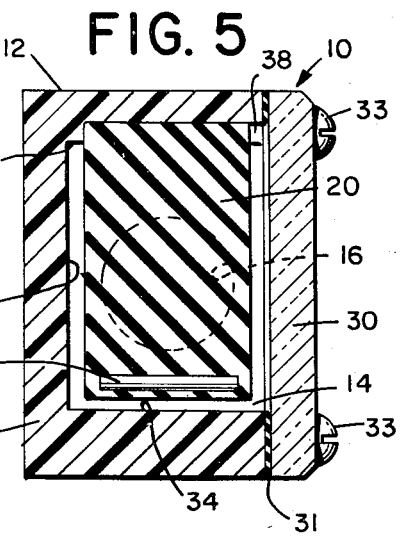
FIG. 5 is a sectional view taken along the line 5—5 of FIG. 3.

The flexible flap 20 is preferably molded from elastomeric material and has a generally rectangular configuration, as best shown in FIG. 5. An integral bead 26 extends transversely along the upper marginal edge portion of the flap, as shown in FIG. 3, for connection with the housing as will be hereinafter further discussed. The illustrated magnet 22 comprises an elongated bar magnet molded in the lower marginal edge portion of the flap 20, substantially as shown in FIG. 5.

The indicator housing may be made of various materials and may take various forms, but preferably, and as shown, the housing 12 is made in two parts and includes a body 28 molded from plastic or like material and a transparent cover 30, made from similar material. The chamber 14 is formed within the body 28 and opens through one side thereof, as best shown in FIG. 5. The cover 30 is sealed to the open side of the body 28 by a gasket 31 and is releasably retained in assembly with the body by a plurality of fasteners 33, 33. The chamber 14 has a generally rectangular cross-section throughout its length and generally complements the cross-sectional configuration of the flap 20, as best shown in FIG. 5. More specifically, the chamber 14 is partially defined by an upper wall 32, a lower wall 34, and a side wall 36 which comprises an integral part of the body 28. As previously noted, the opposite side wall of the chamber 14 is formed by the cover 30. The flap 20 is hingedly supported on the housing at the inlet end of the chamber 14. A transversely extending groove or track 38 formed in the upper wall of the body 28 at the inlet end of the chamber opens outwardly through the open side of the body 28 and downwardly into the chamber 14 and slidably receives the head 26 therein to provide connection between the flap and the housing, as best shown in FIG. 3. The aforesaid arrangement facilitates removal of the flap 20 for cleaning or replacement.

The upper wall 32 has a first portion 40 which curves arcuately downwardly from a point adjacent the flap 20 and generally toward the outlet end of the housing. An upper wall second portion 42, contiguous to the first portion thereof, curves arcuately upwardly from the first portion and toward the outlet end of the chamber. The lower wall 34 curves generally arcuately upwardly from the inlet end of the chamber 14 and generally toward the outlet end thereof. The arcuate contour of the lower wall generally complements an arcuate path generated by the lower edge of the flap 20 as it flexes in the direction of the outlet end, the latter path being indicated by a broken line designated by the reference numeral 44 in FIG. 3.

As previously noted, the indicator of the present invention may include at least one magnetically responsive switch, however, the illustrated embodiment 10 has three such switches indicated at 24, 24. Each switch 24 is a generally conventional reed switch which has two or more reed contacts, one of the contacts being movable relative to the other of the contacts in response to influence of a magnetic field to alter the electrical condition of the switch. As shown, the switches 24, 24 are received within holes which extend transversely into the lower part of the housing 12. Each switch 24 is adapted to be within the magnetic influence of the magnet 22 during a portion of the flexure movement of the flap 20 toward the outlet end of the chamber. The switches 24, 24 are preferably mounted in the housing in spaced relation so that one or the other of the switches is actuated by the magnet 22 whenever a flow condition exists which is in excess of a pre-determined minimum flow condition. The switches may be connected in circuit with a suitable receiver or indicator (not shown) which may, for example, comprise an array of lamps each lamp corresponding to a flow condition indicated by an associated one of the switches 24, 24. In an installation of the latter type, the circuit is preferably arranged so that a signal from only one of the switches is transmitted to the receiver at any given time. This arrangement prevents false indication of flow condition during an interval of flap movement when two switches are simultaneously actuated, as when the flap moves away from one switch 24 and toward the next successive one in its path. Such circuits are known to those skilled in the art.

Fluid flows into the chamber 14 through the inlet opening 16 and causes the flap 20 to flex in the general direction of the outlet opening 18. When a stable flow condition is attained, the flap 20 assumes a substantially stable position in the flow path and remains in that position until a change in flow condition occurs. The position of the flap 20 relative to the housing 12 may be viewed through the observation port or transparent side wall 30 which has indicia of fluid flow condition imprinted thereon as indicated at 46 in FIG. 1. Thus, the flow condition within the associated conduit system may be directly read by observing the position of the flap relative to the housing. When the flap 20 attains a substantially stable condition at least one of the switches 24 is actuated by the magnet 22 to provide remote indication or control as previously discussed. The upper wall 32 cooperates with the flap 20 to change the axis of flexure thereof in response to change in the flow of fluid through the chamber. The arrangement of the flap 20 adjacent the inlet end of the chamber 14 permits the flap to function as a check valve to prevent retrograde flow of fluid through the device. The generally in line arrangement of the inlet and outlet openings 16 and 18 facilitate constant flushing action to prevent foreign particle accumulation within the chamber 14, it may be easily cleared by removing the cover 30.

In the foregoing description of the flow indicator 10, the terms upper and lower have been employed for convenience of description with reference to the unit as oriented in the drawing, however, it should be understood that the device may be calibrated to operate in positions other than the one shown.

I claim:

1. A flow indicator comprising a housing having a chamber and including fluid inlet and outlet openings respectively communicating with opposite ends of said chamber, a flexible flap, means supporting said flap within said chamber at the inlet end thereof to depend from the upper wall of said chamber for hinged flexure about generally parallel axes and generally toward said outlet opening in response to fluid flow through said housing from said inlet to said outlet opening, said flap under condition of no flow from said inlet to said outlet opening providing a closure for said inlet opening to prevent fluid flow through said housing from said outlet opening to and through said inlet opening, said upper wall curving arcuately downwardly from said flap supporting means and generally toward said outlet opening and comprising means for changing the axis of hinged flexure of said flexible flap in response to change in the rate of fluid flow through said chamber from said inlet to said outlet opening, a magnet carried by said flexible flap, and at least one magnetically responsive switch supported by said housing and adapted for connection in an external circuit, said one switch being within the magnetic influence of said magnet during a portion of the flexure of said flap toward said outlet opening.

2. A fluid indicator as set forth in claim 1 wherein said housing includes a transparent observation port through which the relative position of said flap may be observed.

3. A fluid indicator as set forth in claim 2 wherein said observation port has indicia of fluid flow condition associated therewith.

4. A fluid indicator as set forth in claim 2 wherein said observation port comprises a removable cover.

5. A flow indicator as set forth in claim 1 wherein said means for supporting said flap comprises means for releasably retaining said flap in assembly with said housing.

6. A flow indicator as set forth in claim 5 wherein said retaining means comprises a groove in said housing opening through a wall of said chamber and an integral bead on said flap received in said groove.

7. A flow indicator as set forth in claim 6 wherein said housing included a body, a cover, and means for releasably retaining said cover in assembly with said body and said groove is exposed when said cover is removed from said body to permit said flap to be slidably assembled with said body and removed therefrom.

8. A flow indicator as set forth in claim 1 wherein said magnet is sealed within said flap and said switch is supported in said housing externally of said chamber.

9. A fluid flow indicator as set forth in claim 1 wherein the lower wall of said chamber has an arcuate contour which generally complements the arcuate path generated by the lower edge of said flap in its flexure toward said outlet end.

* * * * *